United States Patent [19]

Merrill

[11] Patent Number: 4,717,599

[45] Date of Patent: Jan. 5, 1988

[54] WATER REPELLENT FOR MASONRY

[75] Inventor: Duane F. Merrill, Ballston Spa, N.Y.

[73] Assignee: General Electric Company, Waterford, N.Y.

[21] Appl. No.: 945,584

[22] Filed: Dec. 23, 1986

Related U.S. Application Data

[63] Continuation of Ser. No. 841,979, Mar. 20, 1986, abandoned.

[51] Int. Cl.$^4$ .................. B05D 3/02; C08F 283/12
[52] U.S. Cl. ..................... 427/387; 427/393.5; 525/477; 525/479
[58] Field of Search .................. 427/387, 393.6; 525/477, 479

[56] References Cited

U.S. PATENT DOCUMENTS

| | | | |
|---|---|---|---|
| 2,486,162 | 10/1949 | Hyde | 260/46.5 |
| 4,273,813 | 6/1981 | Meddaugh | 427/387 |
| 4,486,476 | 12/1984 | Fritsch et al. | 427/387 |
| 4,495,340 | 1/1985 | Blizzard et al. | 427/387 X |
| 4,555,419 | 11/1985 | Huhn et al. | 427/387 |
| 4,595,610 | 6/1986 | Fey et al. | 427/387 X |

*Primary Examiner*—Thurman K. Page
*Attorney, Agent, or Firm*—G. L. Loser; J. W. Harbour

[57] ABSTRACT

There is provided a method for rendering masonry water repellent which comprises (a) contacting the masonry with a solution comprising an organopolysiloxane resin selected from the group consisting of resins containing $R_3SiO_{0/5}$ units and $SiO_2$ units and resins containing $R_3SiO_{0.5}$ units, $R_2SiO_2$ units and $SiO_2$ units, the ratio of $R_3SiO_{0.5}$ units to $SiO_2$ units ranging from about 0.2 to about 0.9:1 and resins containing $R_3SiO_{0.5}$ units, $R_2SiO$ units, and the ratio of $SiO_2$ units to $SiO_2$ units being up to about 0.1:1, where each R is an independently selected substituted or unsubstituted alkyl radical, aryl radical, alkaryl radical, aralkyl radical, cycloalkyl radical or alkenyl radical, and (b) evaporating the solvent. Preferably, the resin solution further comprises an alkylalkoxypolysiloxane resin.

22 Claims, No Drawings

WATER REPELLENT FOR MASONRY

This application is a continuation of application Ser. No. 841,979, filed 03/20/86 now abandoned.

BACKGROUND OF THE INVENTION

The present invention generally relates to the treatment of porous materials in order to render them water repellent. More particularly, the present invention relates to silicone compositions suitable for rendering masonry such as brick, concrete, stone, mortar, tile, cinder block, stucco and the like water repellent and stain resistant.

Silicones have been used to render masonry water repellent for many years. The heretofore employed silicones have met with considerable commercial success and are used on all types of masonry. However, the heretofore employed silicones tended to leave the surface of the masonry somewhat tacky and hence caused dirt to adhere thereto. Additionally, many of the previously employed silicones did not maintain excellent water repellency after prolonged exposure to weather nor did they impart stain resistance to the masonry.

U.S. Pat. No. 2,412,470 discloses a process for treating a solid body to render it water repellent which comprises contacting said body with a composition containing, as the active ingredient thereof, a mixture consisting essentially of from about 2.8 to 99.2 weight percent trimethyl silicon chloride and from about 97.2 to 0.8 weight percent silicon tetrachloride.

U.S. Pat. No. 2,574,168 provides a process for rendering porous masonry structures water repellent by applying to such masonry structures a dilute liquid comprising an organic solvent solution of a silicone resin in its B-staged partially condensed form, wherein the concentration of the silicone resin is from about 0.1 to 5 parts by weight, said silicone resin when completely condensed being a heterocyclic and crosslinked condensation product having the formula $(R_mSiO_n)_x$, where x is an integer greater than one, R represents monovalent alkyl or aryl radicals, m is a number less than two but not less than 0.5, and n is a number more than one and not less than about 1.75, the silicon atoms in the resin being linked to the oxygen atoms and the alkyl and aryl radicals being attached to silicon atoms.

U.S. Pat. No. 2,672,455 provides a water repellent for leather which comprises (1) 15 to 50 percent by weight of a titanium compound selected from the group consisting of titanium compounds having the general formula $Ti(OR)_4$ and aliphatic hydrocarbon soluble partial hydrolyzates thereof in which R is an aliphatic hydrocarbon radical or hydroxylated aliphatic hydrocarbon radical, (2) 15 to 70 percent by weight of a methylpolysiloxane copolymer composed of trimethylsiloxane units and $SiO_2$ units, said units being in such proportion that the ratio of methyl radicals to silicon atoms is from 1.0 to 2.5:1, and (3) 15 to 80 percent by weight of polysiloxane having the general formula $R'_n SiO_{(4-n)/2}$, where R' is a $C_{1-4}$ alkyl or alkylene radical or a monocyclic aryl radical, and n having an average value of 2 to 2.9, each silicon atom in polysiloxane (3) having at least one R' radical attached thereto.

U.S. Pat. No. 2,678,893 teaches a method for rendering leather water repellent comprising contacting the leather with a solution of a methylpolysiloxane composed of trimethylsiloxane units and $SiO_2$ units in such proportion that the ratio of methyl radicals to silicon atoms is from 1 to 2.5, said solution containing from 1 to 50 percent by weight of the methylpolysiloxane.

U.S. Pat. No. 2,735,791 relates to a waterproofing composition suitable for application to fibrous organic materials which comprises an aqueous emulsion containing 20 to 60 weight percent, as solids, of a methyl polysiloxanic resin having a $CH_3$ to Si ratio between 1.3:1 and 1.7:1; 20 to 50 weight percent of a methyl polysiloxanic oil having a $CH_3$ to Si ratio between 1.9:1 and 2.1:1; and from 8 to 40 weight percent triethanolamine titanate.

U.S. Pat. No. 2,928,798 discloses compositions useful for rendering porous materials water repellent which comprise, by weight, (1) from 10 to 60 percent of a titanium compound selected from the group consisting of (a) orthotitanates having the general formula $Ti(OR)_4$, where R is an aliphatic hydrocarbon radical or an aminated or hydroxylated aliphatic hydrocarbon radical, and (b) aliphatic hydrocarbon soluble partial hydrolyzates of (a); (2) from 25 to 75 percent of a methylsiloxane copolymer containing trimethylsiloxy units and $SiO_2$ units, wherein the ratio of methyl groups to silicon atoms ranges from about 1 to 1.25, and (3) from 10 to 50 percent of a fluid organopolysiloxane having the formula $R'_nSiO_{(4-n)/2}$, where R' represents both lower alkyl radicals and chlorinated phenyl radicals containing an average of 3 to 5 chlorine atoms per phenyl nucleus, the chlorinated phenyl radicals constituting from 5 to 25 percent of the total number of R' radicals, n has an average value between 1.96 and 2.5, and the viscosity is from 10 centistokes to 100,000 centistokes at 25°C.

SUMMARY OF THE INVENTION

It is an object of the present invention to provide methods and compositions for rendering masonry water repellent.

It is another object of the present invention to provide masonry water repellent compositions which cure to a dry, non-tacky material.

Still another object of the present invention is to provide masonry water repellent compositions which also impart stain resistance to the masonry material.

An additional object of the present invention is to provide a masonry treatment which will remain effective for an extended period of time under severe weather conditions.

In its broadest aspect, the present invention provides a method for rendering masonry water repellent, comprising contacting the masonry with a solution comprising an organopolysiloxane resin selected from the group consisting of resins containing $R_3SiO_{0.5}$ units and $SiO_2$ units, the ratio of $R_3SiO_{0.5}$ units to $SiO_2$ units ranging from about 0.2 to about 0.9:1 (e.g. MQ resins), and resins containing $R_3SiO_{0.5}$ units, $R_2SiO$ units, and $SiO_2$ units, the ratio of $R_3SiO_{0.5}$ units to $SiO_2$ units ranging from about 0.2 to about 0.9:1 and the ratio of $R_2SiO$ units to $SiO_2$ units being up to about 0.1:1 (e.g. MDQ resins); where each R is an independently selected substituted or unsubstituted alkyl radical, aryl radical, alkaryl radical, aralkyl radical, cycloalkyl radical or alkenyl radical; and thereafter evaporating the solvent.

In an especially preferred embodiment, the water repellent composition employed in the practice of the method of the invention is a solution comprising the aforesaid MQ resin and/or MDQ resin and an alkylalkoxypolysiloxane resin.

DESCRIPTION OF THE INVENTION

In accordance with the present invention there is provided a method for rendering masonry water repellent, comprising contacting the masonry with a solution comprising an organopolysiloxane resin selected from the group consisting of resins containing $R_3SiO_{0.5}$ units and $SiO_2$ units, the ratio of $R_3SiO_{0.5}$ units to $SiO_2$ units ranging from about 0.2 to about 0.9:1 and resins containing $R_3SiO_{0.5}$ units, $R_2SiO_2$ units, and $SiO_2$ units, the ratio of $R_3SiO_{0.5}$ units to $SiO_2$ units ranging from about 0.2 to about 0.9:1 and the ratio of $R_2SiO$ units to $SiO_2$ units being up to about 0.1:1; where each R is an independently selected substituted or unsubstituted alkyl radical, aryl radical, alkaryl radical, aralkyl radical, cycloalkyl radical or alkenyl radical; and thereafter evaporating the solvent. Preferably, substantially all of the R groups are methyl.

Methods for preparing such organopolysiloxane resins are well known in the art, for example, as described in U.S. Pat. No. 2,398,672 to Sauer, U.S. Pat. No. 2,676,182 to Daudt et al., U.S. Pat. No. 2,736,721 to Dexter, and U.S. Pat. No. 2,857,356 to Goodwin, Jr., all of which are incorporated by reference into the present disclosure. Other methods for preparing resins of this type will be apparent to those of ordinary skill in the art.

Generally, the MQ and MDQ resins employed in the practice of the invention are provided as a solution in an organic solvent such as xylene or toluene, and typically as a 40 to 60 percent by weight solution. It is, however, desirable to dilute the solution so that it contains from about 1 to about 20 weight percent resin solids before applying it to masonry by conventional means such as, brushing, spraying, and the like. Most preferably, the solution contains about 10 weight percent resin solids.

It should be understood that the term "masonry" as used herein includes, but is not limited to, building and surfacing materials such as brick, concrete cinder block, mortar, tile, stone, stucco, sandstone, limestone and equivalent materials. A particularly preferred aspect of the present invention involves applying the compositions of the present invention to statues and stone monuments in order to protect them from the adverse affects of acid rain and other environmental pollutants.

After the organopolysiloxane resin has been applied to the masonry, the solvent is evaporated by air drying or exposing the coated masonry to elevated temperatures, for example, in a forced hot air oven. For practical reasons, it is usually most convenient to allow the coated masonry to air dry.

It is believed that the excellent and long-lasting protection imparted by MQ and MDQ resins is due, at least in part, to the fact that they penetrate more deeply into the pores of the masonry than do prior art water repellent compositions. Thus, the compositions of the present invention penetrate up to about ⅛ inch below the masonry surface whereas prior art compositions generally do not penetrate more than 1/16 to ⅛ inch. In addition, the MQ and MDQ resins employed in the present invention can be super saturated onto all porous surfaces without staining and any excess on the surface can be brushed off because it is a dry power at 100% solids.

In an especially preferred embodiment of the present invention, the water repellent composition comprises a blend of an MQ resin and/or an MDQ resin and an alkylalkoxypolysiloxane resin. Alkylalkoxypolysiloxane resins contemplated for use in the present invention are described in U.S. Pat. No. 2,624,749 to Bunnell and U.S. Pat. No. 2,810,704 to Krantz, both of which are incorporated herein by reference.

Broadly, suitable alkylalkoxypolysiloxane resins have the empirical formula:

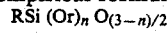
$$RSi(Or)_n O_{(3-n)/2}$$

wherein n is a number from ⅓ to 1; R is a monovalent organic radical having no olefinic unsaturation in which the free valence is connected to an acyclic carbon atom to which at least one hydrogen atom is attached, and in which any atom other than carbon and hydrogen is a halogen having an atomic weight less than 80 that is attached to a carbon atom other than one connected to said acyclic carbon atom; and r is a monovalent organic radical having no olefinic unsaturation in which the free valence is connected to an aliphatic carbon atom to which at least one hydrogen atom is attached, and in which any atom other than carbon and hydrogen is a halogen having an atomic weight less than 80. Preferred alkylalkoxypolysiloxane resin has the general formula:

$$CH_3Si(OCH_3)_n O_{(3-n)/2}$$

where n has a value of from ⅓ to 0.7. This preferred alkylalkoxypolysiloxane resin is prepared by (a) treating methyltrichlorosiloxane in the absence of water and in the presence of a water insoluble inert solvent for the latter with methanol in an amount equal to from 1 to less than 3 moles methanol per mole of methyltrichlorosilane, the upper limit of methanol being sufficient to replace only part of the silicon-bonded chlorine atoms of the methyltrichlorosilane with methoxy groups, the by-product HCl being retained in the reaction mixture; (b) hydrolyzing the mixing of ingredients of (a) with a mixture of ingredients comprising methanol and water in which the water used is present in an amount equal to from 1.15 to 1.33 moles of the latter per mole of methol trichlorosilane originally used, there being employed in step (a) from 25 to 75% of the total amount of methanol used in steps (a) and (b); (c) permitting the hydrolysis product of (b) to condense in the presence of hydrogen chloride dissolved in the reaction mixture; and (d) isolating the resin-containing layer from the multiphase liquid system obtained as a result of the condensation described in (c).

Particularly preferred for use in the present invention are the methylmethoxypolysiloxane resins of Krantz which are available from General Electric Company under the trademark DF104. Other suitable alkoxyfunctional silicone resins will be obvious to the artisan or their suitability can be ascertained without undue experimentation.

Preferably, the MQ resin and/or MDQ resin is blended with the alkylalkoxypolysiloxane resin in a ratio of from about 50 to about 90 parts by weight MQ resin and/or MDQ resin and from about 10 to about 50 parts by weight alkylalkoxypolysiloxane resin (i.e., from about 1:1 to about 9:1), although ratios outside of this range are not precluded. Optimal results have been obtained thus far when there is employed about 70 parts by weight MQ resin and/or MDQ resin and about 30 parts by weight methylmethoxypolysiloxane resin (i.e. DF104).

In order to better enable the artisan to practice the present invention, the following examples are provided by way of illustration and not by way of limitation. All parts and percentages are by weight unless otherwise noted.

EXAMPLES

Example 1

A 60% solids in xylene resin composed of $(CH_3)_3SiO_{0.5}$ units and $SiO_2$ units in a ratio of 0.8:1 was diluted to 10% solids with mineral spirits. The diluted solution was applied by brushing to Danby Vermont Marble, concrete test block, and clay fired, redstone tile. Following air drying for 24 hours the coated materials all exhibited excellent water repellency.

It was noted that the resin solution completely penetrated through 3/8 inch thick marble providing for internal water repellency, not just surface protection as with many prior art film-forming water repellent compositions. It was also noted that the resin solution penetrated about halfway through the 3/8 inch clay fired, redstone tile.

Example 2

The resin solution prepared in Example 1 was coated on concrete test block, dried 48 hours, and weighed before being immersed briefly in water. The block was patted dry with absorbent paper and reweighed. There was an increase in weight of 0.5 gram. The block was then immersed in water for 48 hours, patted dry with absorbent paper and reweighed. There was an increase in weight of 1 gram. Following a 14 day immersion, there was a 4 gram increase in weight compared to a 19 gram increase in weight on a non-treated block.

Example 3

The treated Danby Vermont Marble of Example 1 was further tested for stain resistance. Black spray enamel diluted in toluene and naphtha was sprayed on the surface and after drying for one hour the paint was completely removed with a solvent wipe. On untreated Danby Vermont Marble, the paint left a permanent black stain.

Example 4

A blend containing 50 grams of the MQ resin of Example 1, 4.3 grams of DF104 resin available from General Electric Company, and 276 grams of mineral spirits was mixed by simple shaking in a glass bottle. The blend was completely compatible in solution and was clear upon evaporation of the solvent. A heavy coating of this blend was applied by brushing to a cement test block and air dried for 24 hours. The block was then immersed in water for three days. The block was blotted dry and tested for water repellency with drops of water placed on the surface. The drops flattened showing a low contact angle.

Example 5

A blend of 50 grams of the MQ resin of Examle 1, 8.6 grams DF104 resin, and 301 grams of mineral spirits was prepared and tested as in Example 4. Drops of water placed on the cement block were not as flat as in Example 4, but there was not a sharp contact angle.

Example 6

A blend containing 50 grams of the MQ resin of Example 1, 12.9 grams of DF104 resin, and 327 grams of mineral spirits was prepared and tested as in Example 4. Drops of water placed on the cement block showed a very sharp contact angle and stayed in a sphere.

Example 7

A blend containing 50 grams of the MQ resin of Example 1, 17.2 grams of DF104 resin, and 355 grams of mineral spirits was prepared and tested as in Example 4. The contact angle of drops of water on the cement surface was not as spherical as in Example 6.

I claim:

1. A method for rendering masonry water repellent, comprising:
    (a) contacting the masonry with a solution comprising an organopolysiloxane resin selected from the group consisting of resins containing $R_3SiO_{0.5}$ units and $SiO_2$ units, the ratio of $R_3SiO_{0.5}$ units to $SiO_2$ units ranging from about 0.2 to about 0.9:1 (e.g. MQ resins), and resins containing $R_3SiO_{0.5}$ units, $R_2SiO$ units, and $SiO_2$ units, the ratio of $R_3SiO_{0.5}$ units to $SiO_2$ units ranging from about 0.2 to about 0.9:1 and the ratio of $R_2SiO$ units to $SiO_2$ units being up to about 0.1:1; where each R is an independently selected substituted or unsubstituted alkyl radical, aryl radical, alkaryl radical, aralkyl radical, cycloalkyl radical or alkenyl radical, and
    (b) evaporating the solvent.

2. A method as in claim 1, wherein the organopolysiloxane resin solution contains from about 1 to about 20 weight percent resin solids.

3. A method as in claim 1, wherein the organopolysiloxane resin solution contains about 10 weight percent resin solids.

4. A method as in claim 1, wherein substantially all of the R groups are methyl.

5. A method as in claim 1, wherein the masonry is selected from the group consisting of brick, concrete, cinder block, mortar, tile, stone, stucco, sandstone and limestone.

6. A method as in claim 5, wherein the masonry is a statue or stone monument.

7. A method as in claim 1, wherein the organopolysiloxane resin solution further comprises an alkylalkoxypolysiloxane resin.

8. A method as in claim 7, wherein the alkylalkoxypolysiloxane resin is a methylmethoxypolysiloxane resin.

9. A method as in claim 7, wherein the ratio of organopolysiloxane resin selected from the group consisting of resins containing $R_3SiO_{0.5}$ units and $SiO_2$ units, the ratio of $R_3SiO_{0.5}$ units to $SiO_2$ units ranging from about 0.2 to about 0.9:1 and resins containing $R_3SiO_{0.5}$ units, $R_2SiO$ units, and $SiO_2$ units, the ratio of $R_3SiO_{0.5}$ units to $SiO_2$ units ranging from about 0.2 to about 0.9:1 and the ratio of R2SiO units to SiO2 units being up to about 0.1:1; where each R is an independently selected substituted or unsubstituted alkyl radical, aryl radical, alkaryl radical, aralkyl radical, cycloalkyl radical or alkenyl radical, to alkylalkoxypolysiloxane resin is from about 1:1 to about 9:1.

10. A method as in claim 9 wherein the ratio is about 7:3.

11. A composition for rendering masonry water repellent, consisting of:
    (a) an organopolysiloxane resin selected from the group consisting of resins containing $R_3SiO_{0.5}$ units and $SiO_2$ units, the ratio of $R_3SiO_{0.5}$ units to $SiO_2$ units ranging from about 0.2 to about 0.9:1 and resins containing $R_3SiO_{0.5}$ units, $R_2SiO$ units, and $SiO_2$ units, the ratio of $R_3SiO_{0.5}$ units to $SiO_2$ units ranging from about 0.2 to about 0.9:1 and the ratio of $R_2SiO$ units to $SiO_2$ units being up to about 0.1:1; where each R is an independently selected substituted or unsubstituted alkyl radical, aryl radical, alkaryl radical, aralkyl radical, cycloalkyl radical or alkenyl radical;

(b) an alkylalkoxypolysiloxane resin; and (c) an effective amount of solvent.

12. A composition as in claim 11, wherein the ratio of (a) to (b) is from about 1:1 to about 9:1.

13. A composition as in claim 11, wherein the ratio of (a) to (b) is about 7:3.

14. A composition as in claim 11, wherein the solvent is an organic solvent.

15. A composition as in claim 14, wherein the solvent is selected from toluene and xylene.

16. A composition as in claim 11, wherein the composition is from about 1 to about 20 weight percent resin solids.

17. A composition as in claim 11, wherein the alkylalkoxypolysiloxane resin has the empirical formula $$R\ Si\ (Or)_nO_{(3-n/2)}$$

wherein n is a number from $\frac{1}{3}$ to 1, R is a monovalent organic radical having no olefinic unsaturation in which the free valence is connected to an acyclic carbon atom to which at least one hydrogen atom is attached, and in which any atom other than carbon and hydrogen is a halogen having an atomic weight less than 80 that is attached to a carbon atom other than one connected to said acyclic carbon atom; and r is a monovalent organic radical having no olefinic unsaturation in which the free valence is connected to an aliphatic carbon atom to which at least one hydrogen atom is attached, and in which any atom other than carbon and hydrogen is a halogen having an atomic weight less than 80.

18. A composition as in claim 11, wherein the alkylalkoxypolysiloxane resin has the formula $$CH_3SI\ (OCH_3)_nO_{(3-n/2)}$$

where n has a value of from $\frac{1}{3}$ to 0.7 and is prepared by (a) treating methyltrichlorosilane in the absence of water and in the presence of a water insoluble inert solvent for the latter with methanol in an amount equal to from 1 to less than 3 moles methanol per mole of methyltrichlorosilane, the upper limit of methanol being sufficient to replace only part of the silocon-bonded chlorine atoms of the methyltrichlorosilane with methoxy groups, the by-product HCl being retained in the reaction mixture, (b) hydrolyzing the mixing of ingredients of (a) with a mixture of ingredients comprising methanol and water in which the water used is present in an amount equal to from 1.15 to 1.33 moles of the latter per mole of methyltrichlorosilane originally used, there being employed in step (a) from 25 to 75% of the total amount of methanol used in steps (a) and (b), (c) permitting the hydrolysis product of (b) to condense in the presence of the hydrogen chloride dissolved in the reaction mixture, and (d) isolating the resin-containing layer from the multiphase liquid system obtained as a result of the condensation described in (c).

19. A composition consisting of:

(a) an organopolysiloxane resin selected from the group consisting of resins containing $R_3SiO_{0.5}$ units and $SiO_2$ units, the ratio of $R_3SiO_{0.5}$ units to $SiO_2$ units ranging from about 0.2 to about 0.9:1 and resins containing $R_3SiO_{0.5}$ units, $R_2SiO$ units, and $SiO_2$ units, the ratio of $R_3SiO_{0.5}$ units to $SiO_2$ units ranging from about 0.2 to about 0.9:1 and the ratio of $R_2SiO$ units to $SiO_2$ units being up to about 0.1:1; where each R is an independently selected substituted or unsubstituted alkyl radical, aryl radical, alkaryl radical, aralkyl radical, cycloalkyl radical or alkenyl radical;

(b) an alkylalkoxypolysiloxane resin; and (c) an effective amount of solvent.

20. The composition of claim 19 wherein the alkylalkoxypolysiloxane resin has the empirical formula:

$$R\ Si\ (Or)_nO_{(3-n)/2}$$

wherein n is a number from $\frac{1}{3}$ to 1, R is a monovalent organic radical having no olefinic unsaturation in which the free valence is connected to an acyclic carbon atom to which at least one hydrogen atom is attached, and in which any atom other than carbon and hydrogen is a halogen having an atomic weight less than 80 that is attached to a carbon atom other than one connected to said acyclic carbon atom; and r is a monovalent organic radical having no olefinic unsaturation in which the free valence is connected to an aliphatic carbon atom to which at least one hydrogen atom is attached, and in which any atom other than carbon and hydrogen is a halogen having an atomic weight less than 80.

21. The composition of claim 19 wherein the alkylalkoxypolysiloxane resin has the formula:

$$CH_3Si\ (OCH_3)_nO_{(3-n)/2}$$

where n has a value of from $\frac{1}{3}$ to 0.7.

22. The composition of claim 19 wherein the ratio of (a) to (b) is from about 30:4.3 to about 30:17.2.

* * * * *